(12) United States Patent
Maeda

(10) Patent No.: US 7,916,305 B2
(45) Date of Patent: Mar. 29, 2011

(54) SURFACE REFLECTION ENCODER SCALE AND SURFACE REFLECTION ENCODER USING THE SAME

(75) Inventor: Fujio Maeda, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 299 days.

(21) Appl. No.: 12/142,203

(22) Filed: Jun. 19, 2008

(65) Prior Publication Data

US 2008/0316493 A1 Dec. 25, 2008

(30) Foreign Application Priority Data

Jun. 19, 2007 (JP) ................. 2007-161168

(51) Int. Cl.
*G01D 5/34* (2006.01)
(52) U.S. Cl. ................ 356/499; 250/231.14
(58) Field of Classification Search ............ 356/488, 356/494, 499, 521; 250/231.14, 237 G
See application file for complete search history.

(56) References Cited

U.S. PATENT DOCUMENTS

| | | | | |
|---|---|---|---|---|
| 5,112,435 A | * | 5/1992 | Wang et al. | 216/49 |
| 6,885,457 B1 | * | 4/2005 | Michel et al. | 356/499 |
| 2002/0135876 A1 | * | 9/2002 | Holm et al. | 359/566 |
| 2005/0207013 A1 | * | 9/2005 | Kanno et al. | 359/576 |
| 2005/0211887 A1 | | 9/2005 | Kojima | |

FOREIGN PATENT DOCUMENTS

| | | |
|---|---|---|
| EP | 1 557 701 | 7/2005 |
| JP | 7-113905 | 5/1995 |
| JP | 8-286020 | 11/1996 |
| JP | 10-318793 | 12/1998 |
| JP | 2005-091001 | 4/2005 |

OTHER PUBLICATIONS

"Grooved Infrared Polarizers With a Reduced Reflectance", Yamada I et al, Proceedings of the SPIE, vol. 6414, Dec. 11, 2006, pp. 64141V-1-64141V-11, XP002520867. (English text).

* cited by examiner

*Primary Examiner* — Patrick J Connolly
(74) *Attorney, Agent, or Firm* — Rankin, Hill & Clark LLP

(57) ABSTRACT

A surface reflection encoder scale is used with a surface reflection encoder for detecting a relative movement amount of a member for making a relative move. The surface reflection encoder scale includes a substrate of the member or a substrate provided on the member and a reflection phase grating provided on the substrate and having asperities for changing a phase of reflected diffracted light on its surface. The asperities of the phase grating are formed of a deposition film of metal silicide and chromium.

5 Claims, 3 Drawing Sheets

FIG. 3(A) TiSi2/Cr/GLASS
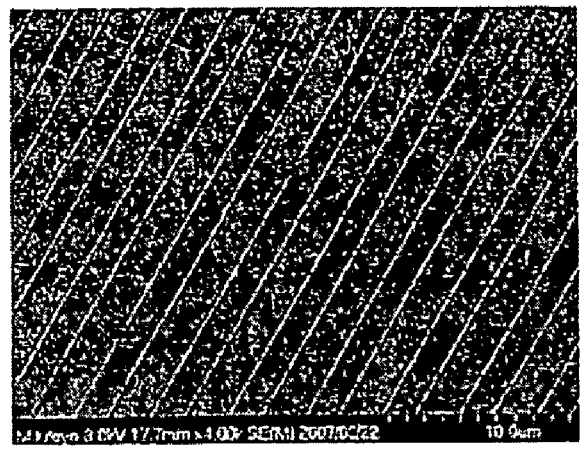
FIG. 3(B)
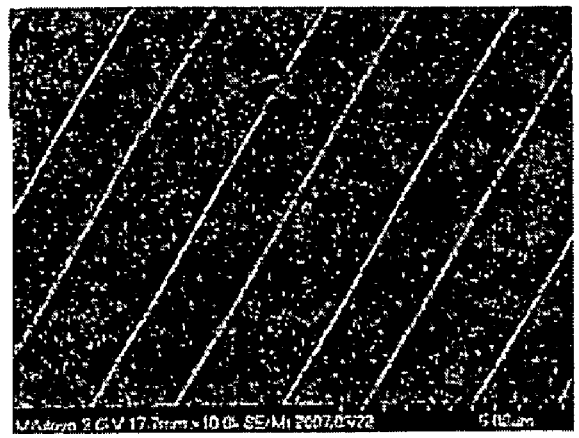
FIG. 3(C) W/Cr/GLASS
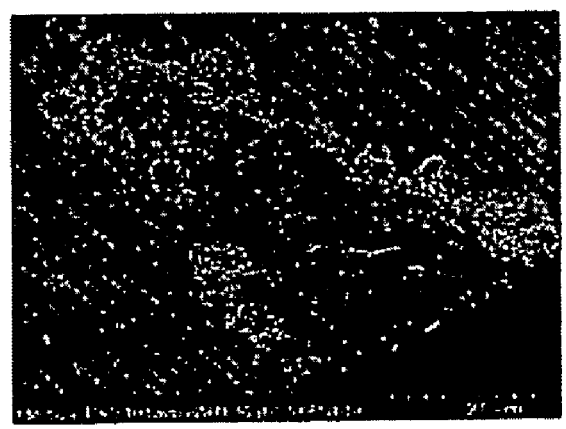

SURFACE REFLECTION ENCODER SCALE AND SURFACE REFLECTION ENCODER USING THE SAME

TECHNICAL FIELD

The present invention relates to a surface reflection encoder scale and a surface reflection encoder using the scale and in particular to an improvement in a phase grating.

RELATED ART

Hitherto, a surface reflection encoder has been used to detect the displacement amount of a member for making a relative move. The surface reflection encoder includes a scale provided with a reflection phase grating and a detection mechanism. In the surface reflection encoder, the detection mechanism makes coherent light incident on the phase grating of the scale, causes reflected diffracted light on the scale to interfere with each other, and detects phase change of the reflected diffracted light changing with a move of the scale using interference of light, thereby providing the movement amount of the scale.

By the way, high signal efficiency and high reliability are demanded for the surface reflection encoder and to meet the demands, various scales have been developed. (For example, refer to patent documents 1 to 3.) A high reflection factor is demanded for the surface reflection encoder scale to reflect light on asperities (concavity and convexity) of the phase grating. To meet such a demand, hitherto, the asperities of a phase grating have been formed of metal having a high reflection factor singly or in combination.

[Patent document 1] Japanese Patent Application Publication No. Hei. 7-113905
[Patent document 2] Japanese Patent Application Publication No. Hei. 8-286020
[Patent document 3] Japanese Patent Application Publication No. Hei. 10-318793

However, although scope for improvement for the reliability remains in the related arts, hitherto the cause impairing the reliability has been still unknown and an appropriate art capable of solving it has not yet existed.

BRIEF SUMMARY OF THE INVENTION

It is therefore an object of the invention to provide a surface reflection encoder scale capable of providing high reliability and a surface reflection encoder using the scale.

As a result of examination about the above-described problems by the inventor, the cause impairing the reliability of the surface reflection encoder was unknown, but the inventor found out that the cause is oxidation of the phase grating surface.

That is, in the phase grating, to provide a stable diffraction grating and high reliability, the shape of the phase grating, particularly, the height needs to be controlled accurately. Thus, a combination of chromium having reliability in a scale and metal functioning as an etching stopper in etching treatment has been examined.

However, in such a combination, oxidation easily occurs on the phase grating surface under a harsh condition, for example, in a high-humidity environment. Since the diffraction efficiency drastically decreases in this portion, the reliability of the encoder is impaired.

To solve such a defective condition, as a result of a furthermore study of the inventor, the inventor arrived at findings that a material combination of metal silicide (particularly, titanium silicide) and chromium from among a large number of materials is extremely effective. That is, high reliability is provided without decreasing the light reflection factor according to the combination of metal silicide and chromium.

Thus, the inventor found the material combination of metal silicide and chromium based on the findings that the unknown cause impairing the reliability of the surface reflection encoder is a decrease in the diffraction efficiency caused by oxidation of the scale surface.

The inventor found that the reliability of the surface reflection encoder can be further improved according to the material combination of metal silicide and chromium, and arrived at completion of the invention.

To select a material of a reflection phase grating, it is a common practice to select one metal or a combination of different metals paying attention only to the light reflection factor. In contrast, the inventor select metal silicide from among a large number of materials for the purpose of providing both a high light reflection factor on the phase grating and stability. Metal silicide of the invention is not obtained until attention is paid to both a high light reflection factor and stability; it is solution means not easily attainable if attention is paid only to the light reflection factor.

<Scale>

That is, to accomplish the above-mentioned object, according to the invention, there is provided a surface reflection encoder scale for use with a surface reflection encoder for detecting a relative movement amount of a member for making a relative move, the surface reflection encoder scale including a substrate of the member or a substrate provided on the member and a reflection phase grating provided on the substrate and having asperities for changing a phase of reflected diffracted light on its surface, wherein the asperities of the phase grating are formed of a deposition film of metal silicide and chromium. In the invention, particularly preferably the metal silicide is titanium silicide.

<Deposition Order>

In the invention, preferably, the chromium film is provided on the substrate so that each concave part of the phase grating is formed of the chromium film, and metal silicide films at a predetermined pitch are provided on the chromium film so that the convex parts of the phase grating are formed of the metal films. The concavity or concave part mentioned here refers to the bottom of the groove.

<Surface Coating>

In the invention, preferably the whole surface of the phase grating is coated uniformly with a thin film of gold.

<Encoder>

To accomplish the above-mentioned object, according to the invention, there is provided a surface reflection encoder including the surface reflection encoder scale according to the invention and a detection mechanism.

The detection mechanism is provided for allowing coherent light to be incident on the phase grating, causing reflected diffracted light to occur, detecting phase change of the reflected diffracted light in the phase grating changing with a relative move of the member using interference of light, and providing a relative movement amount of the member.

As the detection mechanism of the invention, a device described in Japanese Patent Application Publication No. 2005-308718 can be named by way of example.

According to the surface reflection encoder scale according to the invention, the reflection phase grating is formed of a deposition film of metal silicide (particularly, titanium silicide) and chromium, so that high reliability hitherto extremely hard to obtain can be obtained without decreasing the light reflection factor.

In the invention, the chromium film and the metal silicide film are deposited in order from the substrate side to form the phase grating, so that the reliability of the scale can be furthermore improved.

In the invention, further the whole surface of the phase grating is coated uniformly with a thin film of gold, so that the reliability of the scale can be furthermore improved.

Since the surface reflection encoder according to the invention includes the surface reflection encoder scale according to the invention, high reliability hitherto extremely hard to obtain can be obtained without decreasing the light reflection factor.

BRIEF DESCRIPTION OF THE DRAWINGS

In the accompanying drawings:

FIGS. 3(A)-3(C) are schematic comparisons of stability between use of the scale according to the embodiment of the invention and use of a scale in a related art.

DETAILED DESCRIPTION OF THE INVENTION

Referring now to the accompanying drawings, there is shown a preferred embodiment of the invention.

Figure 1:
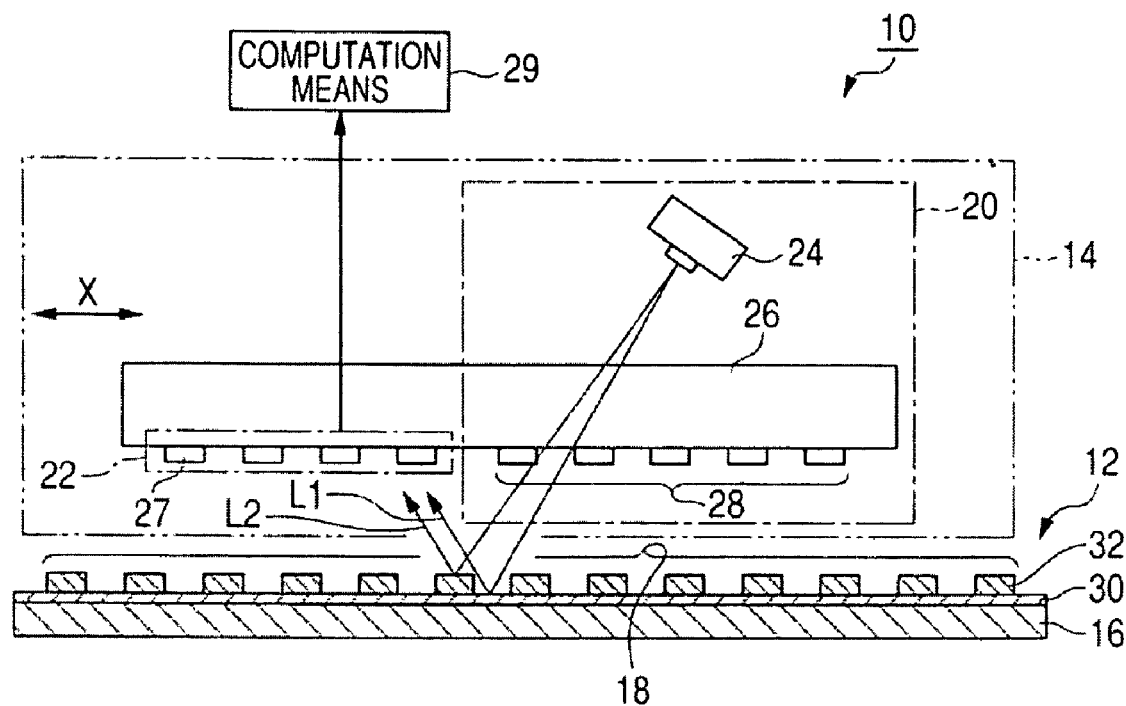
FIG. 1 is a schematic representation to show the schematic configuration of a surface reflection encoder according to an embodiment of the invention.

FIG. 1 shows the schematic configuration of a surface reflection encoder according to an embodiment of the invention.

A surface reflection encoder 10 shown in the figure includes a surface reflection encoder scale 12 and a detection mechanism 14. The surface reflection encoder scale 12 includes a substrate 16 and a reflection phase grating 18. The substrate 16 is, for example, a glass substrate.

The phase grating 18 is formed of a deposition film of titanium silicide and chromium, a feature of the invention, and is provided on the substrate 16. The phase grating 18 is a reflection diffraction grating having grooves (asperities) shaped like a rectangular wave in cross section on the surface and changes the phase of reflected diffracted light.

The detection mechanism 14 includes light emission means 20 and light reception means 22 and detects phase change of reflected diffracted light changing with a move of the scale 12 using interference of light.

The light emission means 20 includes a light source 24 and an optically transparent member 26. The optically transparent member 26 is provided with an index grating 28.

The light reception means 22 is provided on the optically transparent member 26 and contains a group of light reception elements 27.

The detection mechanism 14 allows coherent light from the light source 24 to be incident on the scale 12 through the index grating 28, causes reflected diffracted light ($L_1$ and $L_2$) on the scale 12 to interfere with each other, and detects light and dark change of an interference fringe with a relative move of the scale 12 by the light reception means 22. The light reception means 22 executes photoelectric conversion of the light and dark change of the interference fringe. Computation means 29 provides the relative movement amount of the scale 12 based on an electric signal from the light reception means 22.

The invention is characterized by the fact that the grooves of the phase grating 18 shaped like a rectangular wave in cross section are formed of a deposition film of titanium silicide (metal silicide) and chromium.

Figure 2:
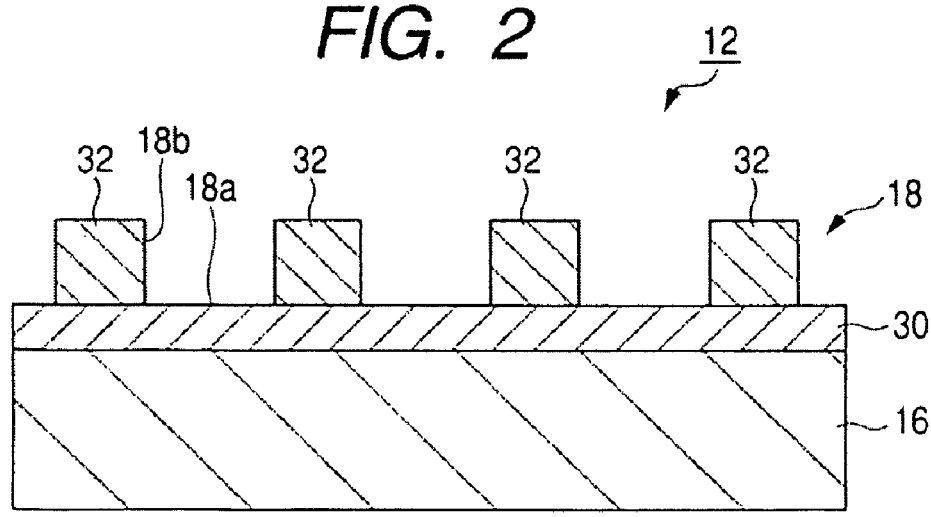
FIG. 2 is an enlarged drawing of the main part of a characteristic scale in the surface reflection encoder according to the embodiment of the invention.
Figure 4A:
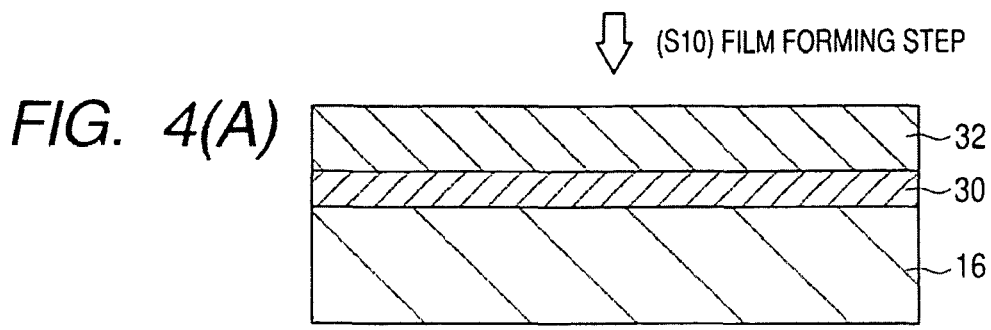
FIGS. 4(A)-4(D) are schematic representations to show a treatment procedure of a manufacturing method of the scale according to the embodiment of the invention.
Figure 4B:
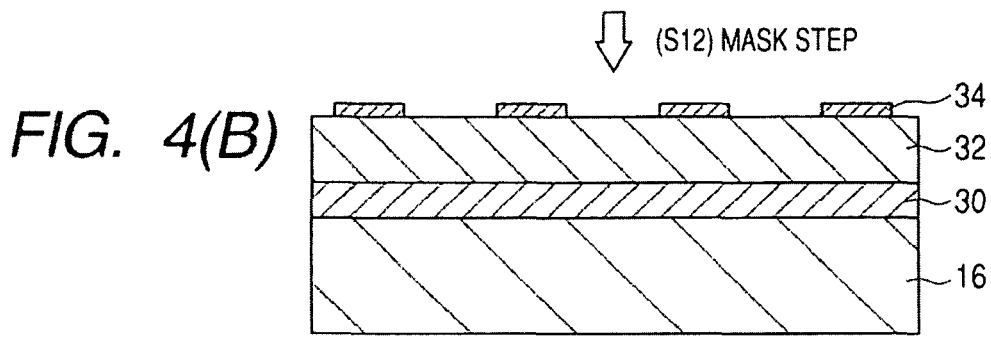
Figure 4C:
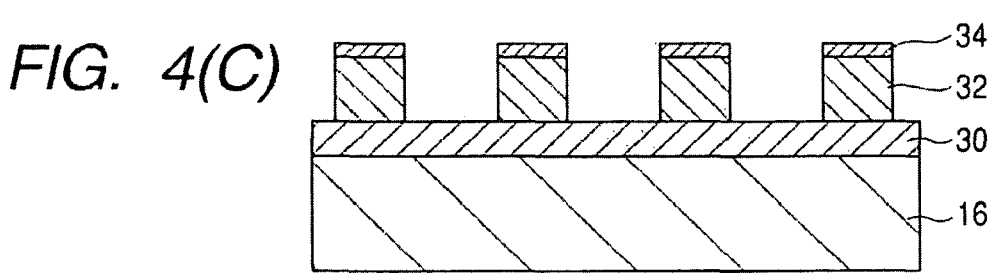
Figure 4D:
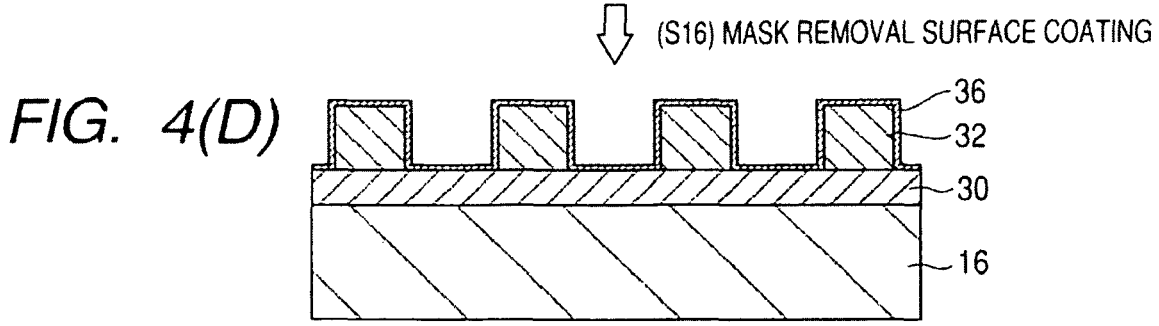

Thus, in the embodiment, the grooves shaped like a rectangular wave in cross section as shown in FIG. 2 are made up of concave parts 18a and convex parts 18b.

As shown in the figure, a chromium film 30 is provided on the substrate 16 so that the concave parts 18a of the phase grating 18 are formed of the chromium film 30. Titanium silicide (metal silicide) films 32 at a predetermined pitch are provided on the chromium film 30 so that the convex parts 18b of the phase grating 18 are formed of the titanium silicide films 32.

The schematic configuration of the surface reflection encoder 10 according to the embodiment has been described and the function of the surface reflection encoder will be discussed below:

The surface reflection encoder 10 according to the embodiment has the means described above and thus can provide a relative movement amount between the detection mechanism 14 and the scale 12. That is, if coherent light is applied from the light source 24 to the index grating 28, a light and dark pattern is produced through the index grating 28. If the detection mechanism 14 is moved along the X axis direction in the figure relative to the scale 12 provided with the phase grating 18, a light signal shaped like a sinusoidal wave responsive to change in the light and dark pattern occurs. For example, a signal of light interfered because of the phase difference between light reflected on the concave part 18a and light reflected on the convex part 18b occurs. Light signals different in phase, contained in the signal are detected by the corresponding light reception elements 27. The output signals of the light reception elements 27 are sent to the computation means 29, which then computes the relative movement amount between the detection mechanism 14 and the scale 12.

In the embodiment, the asperities of the phase grating are formed of the deposition film of chromium and titanium silicide, so that high reliability can be provided without decreasing the light reflection factor.

In the embodiment, titanium silicide having a small membrane stress is used, so that warpage of the substrate can be drastically decreased as compared with any substance other than formed of titanium silicide and chromium in combination. In the embodiment, high reliability can also be provided from the viewpoint of the membrane stress.

The reliability of the surface reflection encoder scale according to the embodiment was confirmed.

FIGS. 3(A)-3(C) show the results of placing the scale according to the embodiment and a comparison example scale of the same shape in the same high-humidity environment.

FIG. 3(A) shows a state of the phase grating surface of the scale according to the embodiment; FIG. 3(B) is an enlarged view of the phase grating surface shown in FIG. 3(A); and FIG. 3(C) shows a state of the phase grating surface of the comparison example scale.

In a test example, the following were used as the scale according to the embodiment and the comparison example scale:

The scale 12 shown in FIG. 2 was used as the scale according to the embodiment. A tungsten film was used in place of the titanium silicide film 32 in the scale 12 shown in FIG. 2 as the comparison example.

Consequently, an accumulation film caused by oxidation was confirmed on the phase grating surface in FIG. 3(C)

indicating the comparison example. In contrast, such oxidation did not occur on the phase grating surface in FIG. 3(A) or (B) indicating the embodiment.

As described above, according to the scale 12 according to the embodiment, oxidation of the phase grating surface can be reliably prevented as compared with the comparison example even in a harsh high-humidity environment, so that a decrease in the light reflection factor on the surface can be reliably prevented. Therefore, in the embodiment, high stability of the scale can be obtained even in a harsh high-humidity environment as compared with any other scale than a deposition film of chromium and titanium silicide, namely, one metal or a combination of different metals, so that high reliability can be provided.

It is to be understood that the invention is not limited to the above-described configuration and various modifications may be made without departing from the spirit and the scope of the invention. For example, more preferably, the following manufacturing method, deposition order, and surface coating are used:

<Manufacturing Method>

In the embodiment, to further improve the reliability, it is very important to create the asperities of the phase grating more uniformly. Thus, in the embodiment, use of the following one among a large number of manufacturing methods is particularly preferred: High-accuracy working of a grating structure and stabilization of diffraction efficiency as the phase grating are accomplished using action as an etching stopper used at the film material working time according to the deposition film structure of titanium silicide and chromium.

FIG. 4 shows a treatment procedure of a manufacturing method of the scale according to the embodiment of the invention. The manufacturing method shown in the figure includes a film forming step (S10), a mask step (S12), and an etching step (S14) in order.

In the film forming step (S10), a film of chromium is formed on a substrate 16 of glass. Next, a film of titanium silicide is formed on the chromium film 30 so that a titanium silicide film 32 is provided with any desired thickness.

In the mask step (S12), exposure of transfer exposure with holography and a mask, etc., developing, and the like are executed for a photo resist film provided on the titanium silicide film 32, thereby forming a parallel grating 34 having a predetermined spacing.

In the etching step (S14), using the chromium film 30 as an etching stopper with the grating 34 of the photo resist film as a mask, etching is performed from above with an etching gas containing a fluorocarbon gas and oxygen to selectively remove a non-mask portion of the titanium silicide film 32. Consequently, the titanium silicide films 32 at a predetermined pitch can be formed on the chromium film 30. Last, the mask (the grating 34 of the photo resist film) is removed.

In the embodiment, the asperities of the phase grating are formed of chromium film 30 and the titanium silicide films, whereby the height of the asperity (groove depth) based on the wavelength of incidence light can be created more uniformly as compared with the asperities of the phase grating formed of one metal. Accordingly, measurement can be conducted with high accuracy.

That is, in the embodiment, the asperities of the phase grating need to be formed more uniformly to provide higher reliability and to conduct encoder detection with high accuracy.

To form the asperities of the phase grating of one metal, it is difficult to create the asperities uniformly by etching.

In contrast, in the embodiment, it becomes easy to create the asperities of the phase grating uniformly by using either of titanium silicide and chromium as an etching stopper.

To adopt such a manufacturing method making it easy to uniformly create the asperities of the phase grating, it is also very important to adopt a combination of titanium silicide and chromium as the phase grating.

<Deposition Order>

To create the asperities of the phase grating more uniformly, it is very important to consider the deposition order of the chromium film and the titanium silicide film.

That is, if a titanium silicide film and a chromium film are deposited in order from the substrate side and chromium is etched with an etching gas containing a chlorine-based gas and oxygen, titanium silicide may also be etched although the amount is a trace amount, namely, is an amount not introducing a problem for use as the scale of the invention.

On the other hand, if a chromium film and a titanium silicide film are deposited in order from the substrate side and titanium silicide is etched with an etching gas containing a fluorocarbon gas and oxygen, chromium serves reliably as an etching stopper and is not etched. Accordingly, the asperities of the phase grating can be created more uniformly.

Thus, in the embodiment, to create the asperities of the phase grating more uniformly, more preferably a chromium film and a titanium silicide film are deposited in order from the substrate side so that each concave part of the phase grating is formed of the chromium film and each convex part of the phase grating is formed of the titanium silicide film.

<Deposition Order>

In the embodiment, the deposition order is also very important from the following reliability viewpoint.

To conduct detection of the encoder of the embodiment with high accuracy, it is necessary to control the height of the asperities of the phase grating (step height) based on the wavelength of incidence light. Thus, it is very important to easily control the film thickness so as to make the convex part of the phase grating thick or thin.

To form the convex part of the phase grating of chromium, the stress of the film formed of chromium is high and thus as the chromium film is made thicker, gradually warpage or peeling easily occurs. Accordingly, there is a possibility that accuracy change of the scale may occur.

In contrast, to form the convex part of the phase grating of titanium silicide, the stress of the film formed of titanium silicide is low and thus warpage or peeling is hard to occur if the titanium silicide film is made thick. Thus, warpage and peeling can be decreased drastically, so that accuracy change of the scale can also be decreased drastically.

From the examination result, in the embodiment, more preferably a chromium film and a titanium silicide film are deposited in order from the substrate side so that each concave part of the phase grating is formed of the chromium film and each convex part of the phase grating is formed of the titanium silicide film as compared with any other deposition order.

<Surface Coating>

In the embodiment, to conduct detection with higher accuracy, it is also very important to raise the light reflection factor of the whole scale. To raise the light reflection factor of the whole scale, preferably the surface of the phase grating is coated with metal, in which case particularly preferably, stable metal is selected from among metals having a high reflection factor.

In the embodiment, chromium and titanium silicide having good adherence to gold are selected to obtain both the reflection factor and the reliability of the scale.

That is, in the embodiment, a surface coating step (S16) is provided after removal of the mask shown in FIG. 4. In the surface coating step (S16), the whole surface of a phase grating 18 is coated uniformly with a thin film 36 of gold as shown in FIG. 4(D). Consequently, in the embodiment, the light reflection factor of the whole scale can be more raised, so that the reliability of the scale can be furthermore improved.

The surface reflection encoder of the invention is not limited to the configuration described above and any can be used if it uses the surface reflection encoder scale. The surface reflection encoder scale of the invention can also be used as the scale of the encoder described in any of patent documents 1 to 3, for example.

Particularly preferably, the phase grating of the invention is formed of grooves shaped like a rectangular wave in cross section, but the grooves can also be shaped like a sinusoidal wave or a saw-tooth-wave in cross section.

What is claimed is:

1. A surface reflection encoder scale for use with a surface reflection encoder for detecting a relative movement amount of a member making a relative move, said surface reflection encoder scale comprising:
   a substrate of the member or a substrate provided on the member; and
   a reflection phase grating provided on the substrate and having asperities for changing a phase of reflected diffracted light on its surface,
   wherein the asperities of said phase grating are formed of a deposition film of metal silicide and chromium.

2. The surface reflection encoder scale as claimed in claim 1, wherein the metal silicide is titanium silicide.

3. The surface reflection encoder scale as claimed in claim 2,
   wherein the chromium film is provided on said substrate so that each concave part of said phase grating is formed of the chromium film, and
   wherein the metal silicide films at a predetermined pitch are provided on the chromium film so that the convex parts of said phase grating are formed of the metal silicide films.

4. The surface reflection encoder scale as claimed in claim 3, wherein the whole surface of said phase grating is coated uniformly with a thin film of gold.

5. A surface reflection encoder, comprising:
   a substrate of a member or a substrate provided on the member;
   a reflection phase grating provided on the substrate and having asperities formed of a deposition film of titanium silicide and chromium for changing a phase of reflected diffracted light on its surface, wherein the whole surface of said phase grating is coated uniformly with a thin film of gold, wherein the chromium film is provided on said substrate so that each concave part of said phase grating is formed of the chromium film, and wherein the titanium silicide films at a predetermined pitch are provided on the chromium film so that the convex parts of said phase grating are formed of the metal silicide films; and
   a detection mechanism for allowing coherent light to be incident on the phase grating, causing reflected diffracted light to occur, detecting phase change of the reflected diffracted light in the phase grating changing with a relative move of the member using interference of light, and providing a relative movement amount of the member.

* * * * *